(No Model.)

E. THOMAS.
CAR FENDER.

No. 523,693.  Patented July 31, 1894.

WITNESSES.
Matthew M. Blunt
J. Murphy.

INVENTOR.
Edgar Thomas
by Jas. H. Churchill
Atty.

UNITED STATES PATENT OFFICE.

EDGAR THOMAS, OF PITTSBURG, ASSIGNOR OF ONE-HALF TO PHILIP M. AMBERG, OF ALLEGHENY, PENNSYLVANIA.

CAR-FENDER.

SPECIFICATION forming part of Letters Patent No. 523,693, dated July 31, 1894.

Application filed February 24, 1894. Serial No. 501,358. (No model.)

*To all whom it may concern:*

Be it known that I, EDGAR THOMAS, residing in Pittsburg, in the county of Allegheny and State of Pennsylvania, have invented an Improvement in Car-Fenders or Safety-Guards, of which the following description, in connection with the accompanying drawings, is a specification, like letters on the drawings representing like parts.

This invention relates to a safety-guard or fender for railway cars, and more especially for electric and cable street railway cars.

My present invention has for its object to provide a more efficient and simple device for the purpose specified.

In accordance with this invention, the safety-guard is composed of two members or parts, one of which is adapted to be attached to the car body and preferably to the frame of the car truck, and which member, for the purpose of this invention, may be designed as the fixed member, the other member being pivoted to the fixed member and normally projecting downward and outward to near the road bed in which the railway is laid. The pivoted or movable member is designed to receive the blow, caused by its striking an object on the track, and the said member is adapted to be forced when it strikes the object, down nearer the road bed, and thereby prevent the fender from being forced over the object, which in the case of a human being, might result in crushing out life or being run over by the wheels of the car.

Another feature of this invention, consists in reducing to a minimum the force of the blow imparted to the object by the pivoted member of the fender striking the same, which is accomplished by providing the pivoted member with cushions or yielding stops, which prevent a too rapid movement of the pivoted member toward the road bed but yield sufficiently to greatly reduce the force of the blow and thereby avoid serious accidents to an object struck by the fender.

The invention further consists in providing means by which the position of the pivoted member with relation to the road bed may be adjusted or varied so that the fender may be applied to different styles of cars and yet have the pivoted member normally at substantially the same distance from the road bed.

These and other features of this invention will be pointed out in the claims at the end of this specification.

Figure 1:
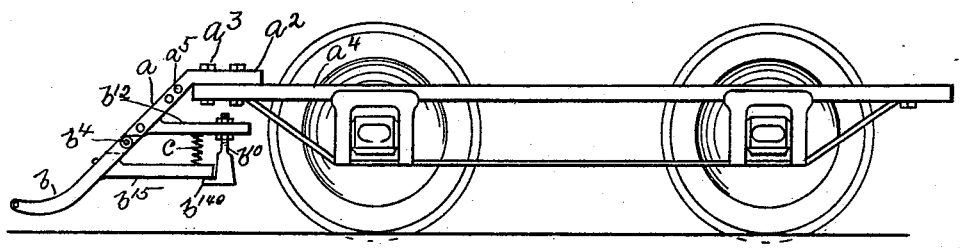
Figure 2:
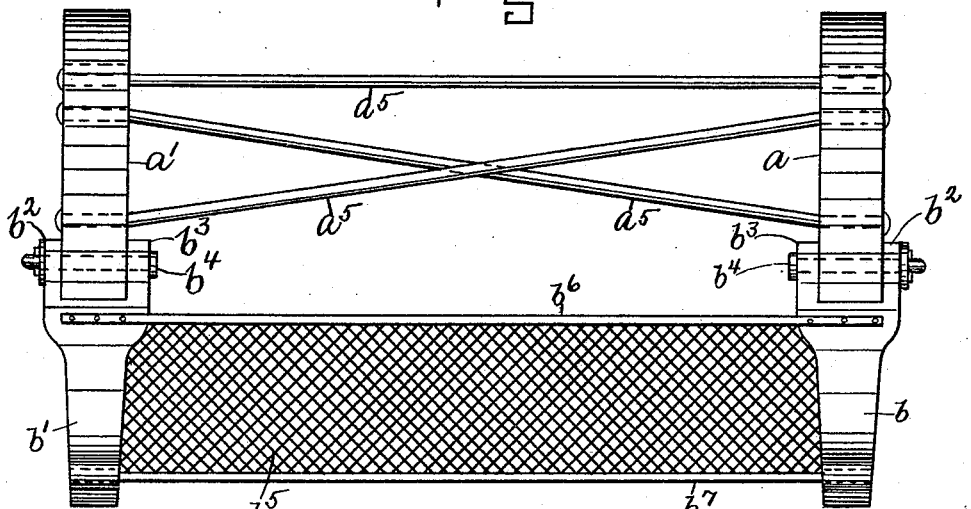

Figure 1 is a side elevation of one form of car truck provided with a safety-guard or fender embodying this invention; Fig. 2, a front elevation on an enlarged scale of the fender shown in Fig. 1, and Fig. 3, a side elevation on an enlarged scale and partially broken out of the fender shown in Fig. 2.

The car fender or safety-guard herein shown as embodying this invention, is composed essentially of two parts or members, one of which is designed to be rendered fixed or stationary and the other of which is movable, as will be described.

The fixed or stationary member of the fender or guard, may and preferably will be made as herein shown, it consisting of two bars or pieces $a\ a'$ preferably inclined and each provided with a rearward extension or arm $a^2$, adapted to be fastened as by bolts $a^3$ or otherwise, to the frame $a^4$ of the car truck, which latter is herein shown as a four wheel truck, but which may be of any desired or suitable construction. The bars or pieces $a\ a'$ may and preferably will be connected by cross or tie bars, rods or pieces $a^5$, which may be of any suitable construction. The side bars $a\ a'$ have pivotally secured to them the movable member of the fender, which may and preferably will be made as herein shown, it consisting of side pieces or frames $b\ b'$ provided at their upper ends with jaws or forks $b^2\ b^3$ adapted to receive between them, the lower end of the side bars or pieces $a\ a'$ of the fixed member, and which may be pivotally secured in the said jaws by suitable pins, bolts, or rods $b^4$.

The side frames $b\ b'$ of the movable member of the fender may and preferably will be connected by a netting $b^5$ of any suitable material, which in the present instance, is shown as attached to cross bars $b^6\ b^7$ secured to the said side frames, but instead of the netting $b^5$, I may use any suitable or desired construction, such for instance as small wire rods, wooden bars, boards, ropes, &c., but I prefer the netting.

The pivoted lower member of the fender may and preferably will be adjustable with relation to the road bed, which may be accomplished by means of adjustable devices or hangers, shown as bolts, bars or threaded rods $b^{10}$, only one of which is shown, which is preferably fastened to the stationary or fixed member or a part thereof, and which in the present instance is inserted through a suitable opening in an arm or bar $b^{12}$ extending from each side bar $a\,a'$ of the fixed member, the threaded bar or rod $b^{10}$ being secured to the arm $b^{12}$ by nuts $b^{13}\,b^{14}$. Each bar or rod $b^{10}$ is preferably provided with a lug $b^{140}$ upon which normally rests an arm $b^{15}$, secured to or forming part of each side frame or bar of the movable member of the fender.

The movable member of the fender is preferably held in its normal position, by means of yielding devices, buffers or springs $c$, only one of which is shown, and each of which is preferably seated in a socket $c'$ in the upper face of the arm of each side frame, the upper end of the spring being shown as encircling a depending lug or stud $c^3$ on the under side of the arm $b^{12}$. The side frames $b\,b'$ of the movable member may be provided on their under side at their front end with suitable devices, such for instance, as rollers, which are not herein shown.

Figure 3:
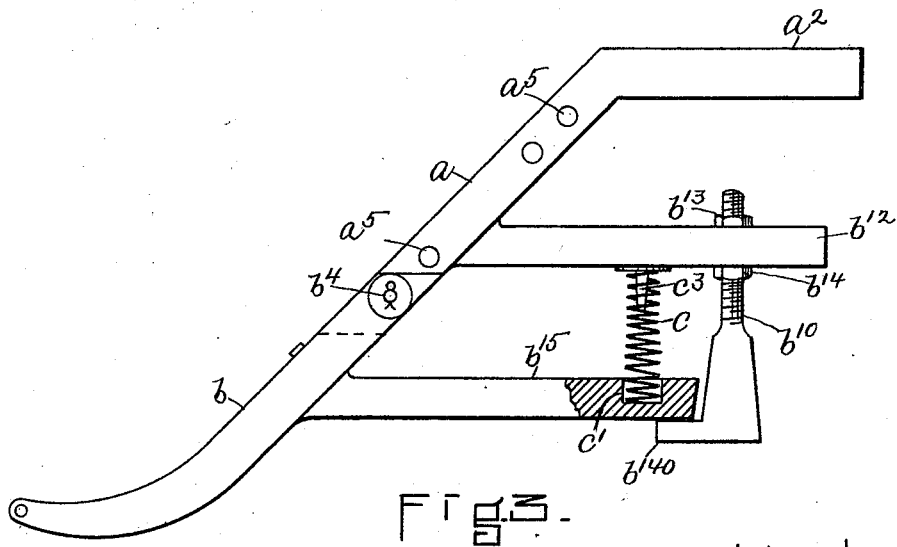

The operation of my improved fender may be briefly described as follows:—The parts occupy normally substantially the position shown in Figs. 1 and 3, and when in the travel of the car, the movable member of the fender strikes an object, the said member is turned on its pivots, so that its lower front end is brought nearer the road bed, which prevents a person or other object from being allowed to be forced under the fender and in a position to be injured by the wheels of the truck. Furthermore, when the object is struck by the movable member of the fender, the force of the blow is greatly diminished by the fact that the said member is movable and also by reason of the cushioning effect of the springs or like yielding medium, so that the liability of serious injury to a person by being struck by the fender is reduced to a minimum. By means of the adjustable hangers, the movable member of the fender may be adjusted with relation to the road bed, so that in the normal position of the said movable member, it will be only the desired distance above the road bed, which is an advantage, as this fender may be readily and correctly applied to a variety of cars and trucks.

I prefer to attach the fixed member of the fender to the truck, as this is an advantage when used with cars of short body, as the oscillation or teetering of the car body does not change the position of the movable member with relation to the road bed, but I do not desire to limit my invention in this respect as the fixed member may be fastened to the car body.

I claim—

1. A car fender or safety guard comprising one member adapted to be rendered fixed or stationary, and having side bars $a,\,a'$ a movable member pivoted to the said side bars and provided with a rearwardly extended arm, a rigid hanger co-operating with the said arm to support the said pivoted member, and a cushion to normally keep said arm in engagement with the said hanger, substantially as described.

2. A car fender or safety guard comprising one member adapted to be rendered fixed or stationary, a movable member pivoted to the fixed member and provided with a rearwardly extended arm, a vertically adjustable hanger co-operating with the said rearwardly extended arm, and a vertically disposed cushion acting on the said arm to normally keep said arm in engagement with the said hanger, substantially as described.

3. A car fender comprising a fixed member consisting of two sides or pieces provided with rearwardly extended arms $b^{12}$, a movable member consisting of side frames pivoted to the sides or pieces of the fixed member and provided with rearwardly extended arms $b^{15}$, a hanger adjustably secured to an arm $b^{12}$ and adapted to support an arm $b^{15}$, and a cushion between said arms, substantially as described.

4. A car fender comprising a fixed member consisting of two sides or pieces and tie rods or cross bars connecting said sides or pieces, a movable member consisting of side frames pivoted to the sides of the fixed member, means to connect the side frames of the movable member, a hanger to support the pivoted member, and a cushion acted upon by the movable member, substantially as described.

In testimony whereof I have signed my name to this specification in the presence of two subscribing witnesses.

EDGAR THOMAS.

Witnesses:
A. C. MUNHALL,
PHILIP M. AMBERG.